United States Patent [19]

Basten et al.

[11] Patent Number: 4,953,308
[45] Date of Patent: Sep. 4, 1990

[54] FILTER SYSTEM FOR A FLUID BED GRANULATOR/DRYER

[75] Inventors: Aaron K. Basten, Solon; Robert W. Claassen, Swisher, both of Iowa

[73] Assignee: Vector Corporation, Marion, Iowa

[21] Appl. No.: 306,102

[22] Filed: Feb. 6, 1989

[51] Int. Cl.⁵ .............................................. F26B 21/06
[52] U.S. Cl. ............................................. 34/82; 55/302
[58] Field of Search ..................... 34/82, 60, 61, 79; 55/316, 302, 319, 315, 318

[56] References Cited

U.S. PATENT DOCUMENTS

| | | |
|---|---|---|
| Re. 32,185 | 6/1986 | Copley . |
| 4,151,095 | 4/1979 | Wright . |
| 4,218,227 | 8/1980 | Frey . |
| 4,242,115 | 12/1980 | Harold et al. . |
| 4,243,397 | 6/1981 | Tokar et al. . |
| 4,261,710 | 4/1981 | Sullivan . |
| 4,299,604 | 11/1981 | Brenholt . |
| 4,304,580 | 12/1981 | Gehl et al. . |
| 4,322,230 | 3/1982 | Schoen et al. . |
| 4,323,369 | 4/1982 | Monson et al. . |
| 4,331,459 | 5/1982 | Copley . |
| 4,345,922 | 8/1982 | Grassel . |
| 4,345,923 | 8/1982 | Schoen . |
| 4,350,509 | 9/1982 | Alseth et al. . |
| 4,359,330 | 11/1982 | Copley . |
| 4,364,751 | 12/1982 | Copley . |
| 4,395,269 | 7/1983 | Schuler . |
| 4,410,427 | 10/1983 | Wydeven . |
| 4,443,235 | 4/1984 | Brenholt et al. . |
| 4,452,616 | 6/1984 | Gillingham et al. . |
| 4,460,390 | 7/1984 | Alset et al. . |
| 4,498,914 | 2/1985 | Ericksen . |
| 4,504,293 | 12/1985 | Gillingham et al. . |
| 4,507,203 | 6/1985 | Johnston . |
| 4,509,960 | 4/1985 | Engel . |
| 4,512,891 | 4/1985 | Wright et al. . |
| 4,514,193 | 4/1985 | Booth . |
| 4,515,607 | 5/1985 | Wolde-Michael . |
| 4,589,983 | 5/1986 | Wydevan . |
| 4,615,800 | 10/1986 | Stifelman et al. . |
| 4,617,122 | 10/1986 | Kruse et al. . |

Primary Examiner—Henry A. Bennet
Attorney, Agent, or Firm—Hill, Van Santen, Steadman & Simpson

[57] ABSTRACT

A novel filter system for fluid bed granulator/dryer machines which utilizes pleated filter elements that can be stacked end to end so as to remove material from the exhaust air and wherein a number of filter elements can be mounted parallel to each other and end to end to obtain the desired filter capacity. In a first embodiment, the filters extend horizontally across the machine and in the second embodiment they extend it in a slanted plane across the machine. The filters can be cleaned by alternately providing reverse air flow through them.

4 Claims, 3 Drawing Sheets

FLOW PATH THROUGH FILTER

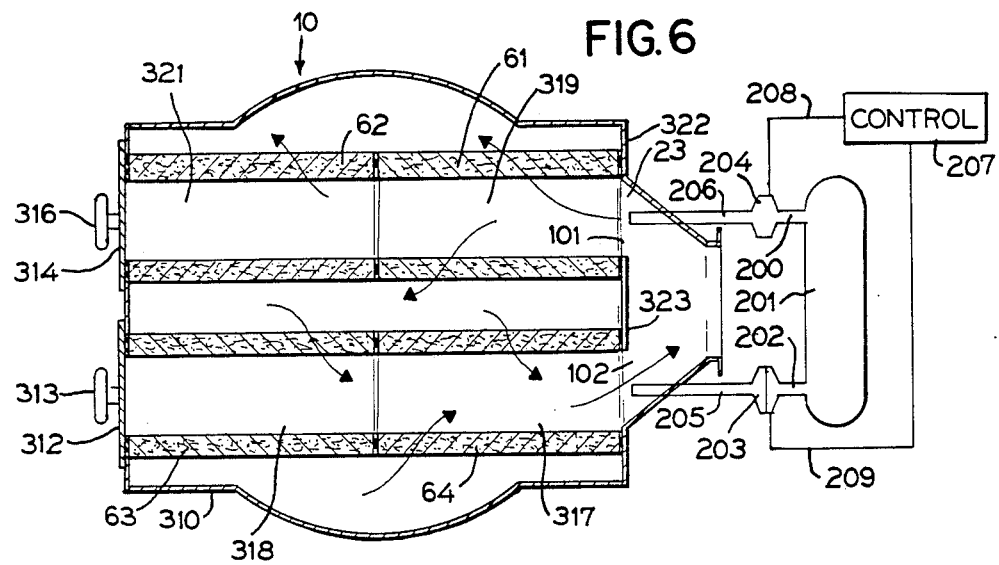
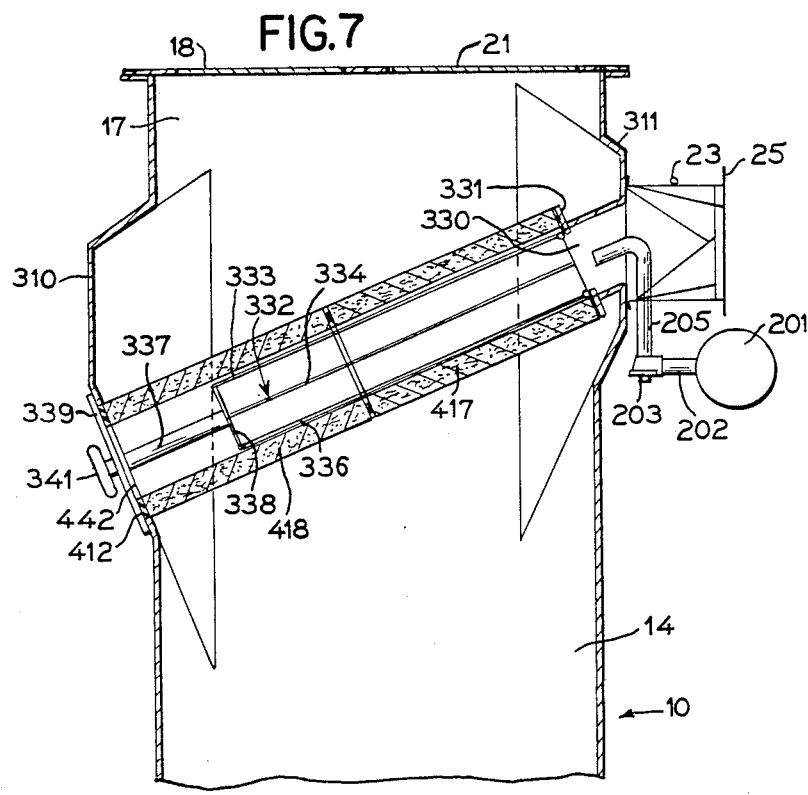

FILTER SYSTEM FOR A FLUID BED GRANULATOR/DRYER

BACKGROUND OF THE INVENTION

Field of the Invention

This invention relates in general to fluid bed granulators, coaters and dryers and in particular to a pleated filter cartridge system for such machines. The invention also provides a cleaning system in which alternately pressure is applied to the filters in the reverse direction so as to clean them automatically.

Description of the Prior Art

Prior art fluid bed granulator and dryer machines have used bag filters to remove material in the exhaust air and it has been a problem to maintain the filters free of material.

SUMMARY OF THE INVENTION

It is a feature of the present invention that it provides pleated cylindrical-shape filter elements which can be mounted in the exhaust system of a fluid granulator or dryer and wherein said filter elements can be mounted end to end to form a composite filter. One or more of the composite filter elements thus formed are mounted in communication with the exhaust outlet duct. The pleated filter cartridges contain a considerably larger filter fabric area than conventional filter socks.

It is an object of the present invention to provide an improved filter system for a fluid bed granulator, coater or dryer.

It is another object of the invention to provide a filter cleaning system which alternately cleans the filters by providing back flow through a filter element to remove particulate from its outside surface and where the back flow to particular elements is alternately applied.

It is also an object of the invention to provide an automatic cleaning system for filter elements in a fluid bed granulator or dryer. Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 6 is a top sectional view illustrating the cleaning system of the invention; and FIG. 7 illustrates a modification of the invention.

DESCRIPTION OF THE PREFERRED EMBODIMENTS

Figure 1:
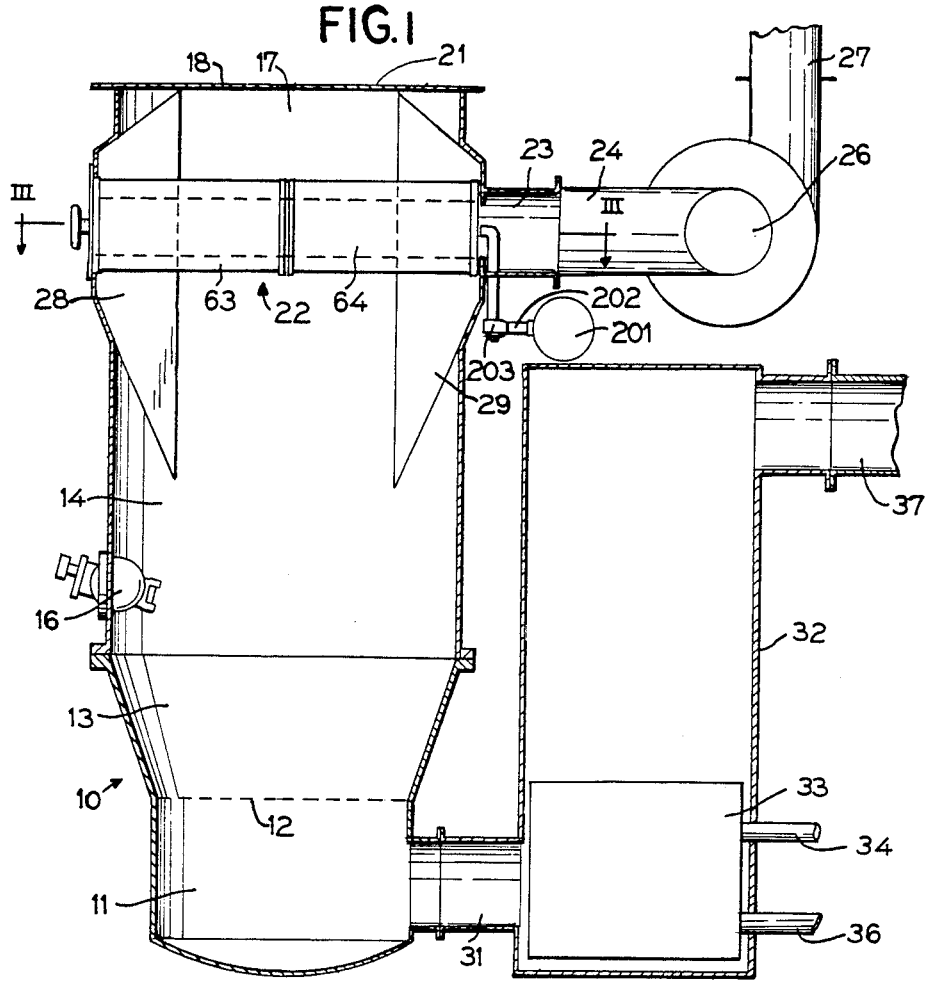
FIG. 1 is a sectional view of a fluid bed granulator/dryer of the invention.
Figure 2:
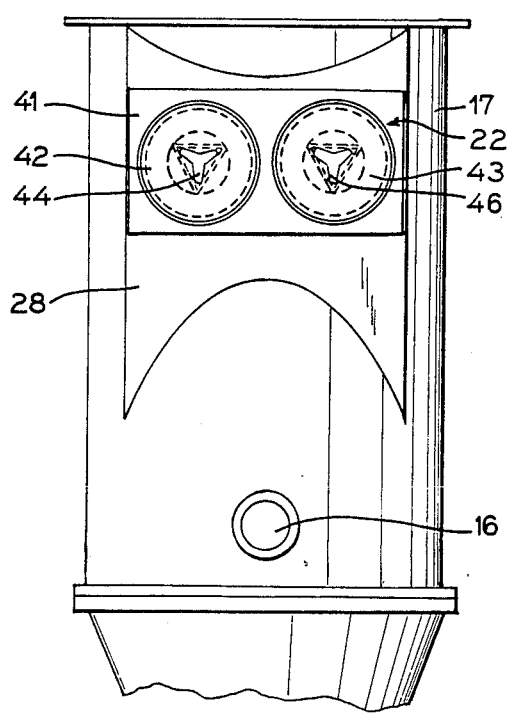
FIG. 2 is a plan view illustrating the ends of the filters.

FIGS. 1-6 illustrate a fluid bed granulator/dryer machine 10 which has a lower portion 11 across which is mounted a screen 12 to support a product such as tablets or other material which is to be granulated or dried. Above the screen 12 is a tapered container portion 13 and above portion 13 is a cylindrical portion 14. Explosion type vents 18 and 21 close the upper end of the cylindrical member 14 and a filter assembly 22 according to the invention is mounted in an upper portion 17 of the cylindrical portion 14. An inlet air duct 31 is connected to the lower portion 11 as shown in FIG. 1 and is connected to an input plenum 32 which has an input air duct 37 connected to its upper end as shown. A heat exchanger 33 is mounted in the plenum 32 and has an input steam pipe 34 and an output steam pipe 36 so that the heat exchanger 33 can heat air before passing through the granulator/dryer. A number of spray guns 16 are mounted in the spray/expansion chamber 14 about the periphery thereof and can be adjusted to vary the spray from outside of the vessel by controlling the solution spray rate, the atomization air volume, the spray pattern and the spray angle.

Figure 3:
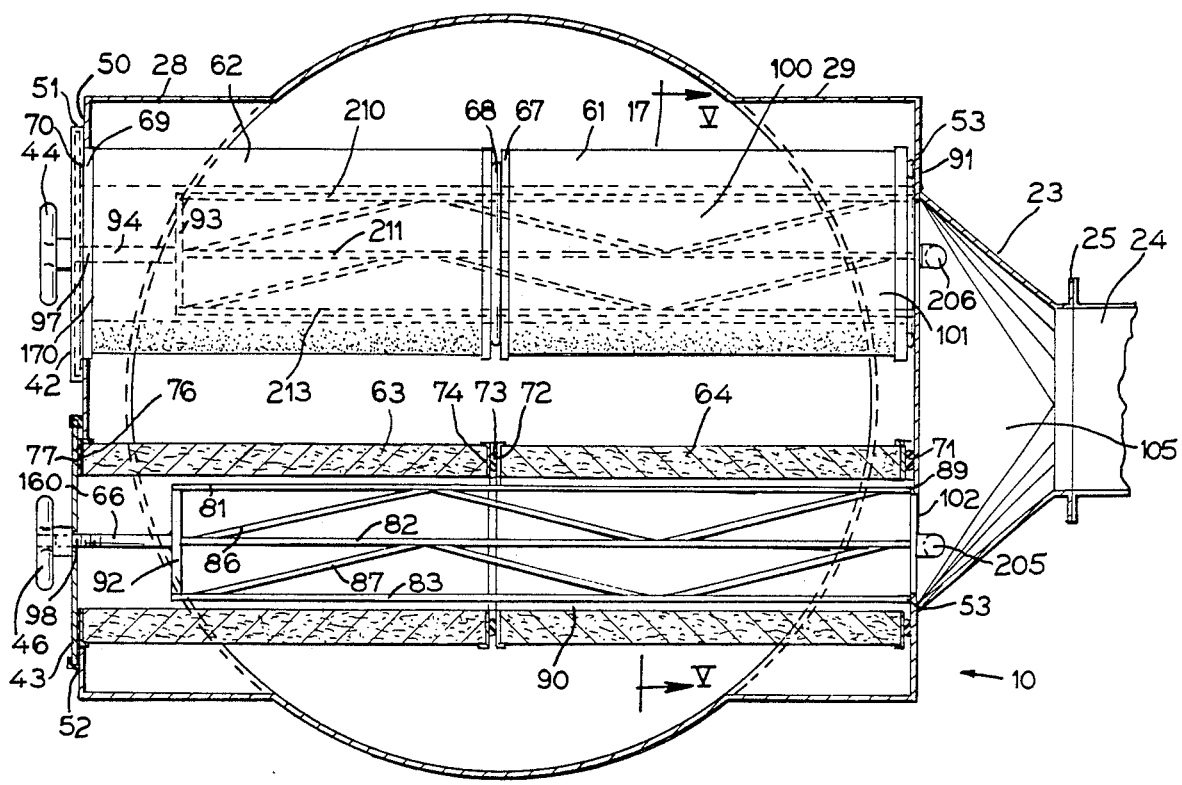
FIG. 3 is a top plan view illustrating the filters of the invention.
Figure 4:
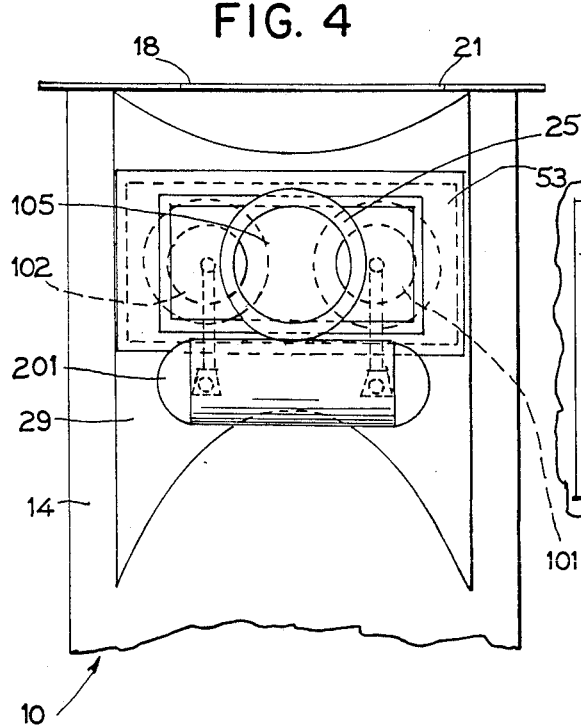
FIG. 4 is a plan view from the right relative to FIG. 3.
Figure 5:
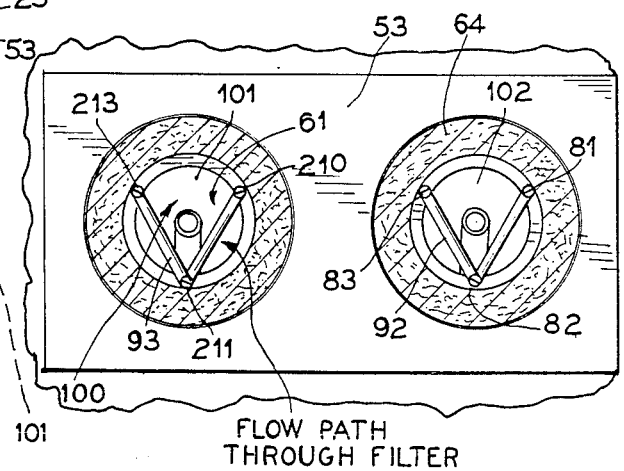
FIG. 5 is a sectional view taken on V-V from FIG. 3.

The filter assembly 22 is mounted to the machine 10 by providing a pair of external transition members 28 and 29 which attach to the outer surface of the cylindrical portion 14 as shown in FIGS. 1, 2, 3 and 4. A pair of openings 101 and 102 are formed in the back plate 53 of the transition member 29. A first filter support 90 is connected as by welding to the back plate 53 about the opening 102 and comprises three longitudinal rods 81, 82 and 83 which extend into the interior of the machine and which are provided with braces such as the braces 86 and 87 illustrated in FIG. 3. A second filter support 100 comprises longitudinally extending rods 210, 211 and 213 which are welded to the end plate 53 about opening 101 and which have their opposite ends connected by rods 93 as shown in FIG. 3. The rods 81, 82 and 83 are connected by end brace rods 92 as shown in FIGS. 3 and 5. A rod 66 is welded to the end brace rods 92 and has a threaded portion 98 upon which a threaded knob or handle 46 can be received. The end 52 of transition member 28 is formed with openings 160 and 170 and a cover plate 43 which has an outer edge gasket 52 has an opening through which the threaded rod 66 extends and the cover plate 43 is held by the knob 46. A cover plate 42 fits over the opening 170 and has an outer gasket 51. A threaded knob 44 is threadedly received on a threaded shaft 94 which is connected to the end cross braces 93 of the filter support 100. The shaft 94 passes through an opening formed in plate 42.

A pair of filter elements of general cylindrical-shape 61 and 62 are mounted on the filter support 100 as shown in FIGS. 3 and 5. The filter 62 has an end gasket 68 which rests against the end 67 of the filter 61. The filter 61 has an end gasket 91 which engages the end plate 53 about the opening 101. A gasket 70 is mounted between the cover plate 42 and the end 69 of the filter 62.

A pair of filters 63 and 64 are mounted end to end on the filter support structure 90. The filter 64 has a gasket 71 which rests against the end plate 53 about the opening 102. The filter 63 has a gasket 73 on its end 74 which rests against the end 72 of the filter 64. A gasket 77 is mounted between the cover plate 43 and the end 76 of the filter 63. As shown in FIGS. 1 and 3, an outlet duct 105 is connected to end wall 53 over the openings 101 and 102 and is connected by a flange 25 to an exhaust conduit 24 to which is mounted an exhaust blower 26 which has an outlet duct 27.

In operation, air is drawn into the inlet duct 37 through the plenum 32 past the heat exchanger 33 and into the conduit 31 into the lower portion 11 of the machine 10. The air passes up through the screen 12, through the product 13 being processed, past the sprayer 16 and through the chamber 14. The air exhausts from the machine through the filters 61, 62, 63 and 64 passing through the outer surface of the filters into the central openings formed therein as shown in FIG. 6 and through the opening 101 and 102 into the member 23 and out the exhaust duct 24 to the exhaust blower 26 and out the exhaust conduit 27.

An automatic cleaning system is provided for the filters 61, 62, 63 and 64 which is shown in FIG. 6. An air pressure tank 201 has outlet pipes 200 and 202 and the pipe 200 is connected to a valve 204 which has an outlet pipe 206 which extends into the opening 101. The valve 203 is connected to pipe 202 and has an outlet pipe 205 which extends into the opening 102. A control 207 is connected by control wire 208 to valve 204 and to valve 203 by a control wire 209. The valves 204 and 203 may be electrically or pneumatically actuated valves such as solenoid or pilot operated valves which can be energized by electrical or pneumatic signals supplied by the control 207 on the leads 208 and 209. The control 207 alternately opens and closes the valves 204 and 203. When valve 204 is opened and valve 203 is closed, air enters from the air tank 201 into opening 101 and passes in the reverse direction through the filters 61 and 62 as shown in FIG. 6 and then from the inside of the machine into the filters 63 and 64 and out the opening 102 through the exhaust blower 26. When the air passes through the filters 61 and 62 in the reverse direction as shown in FIG. 6, the particulate material which is accumulated on the outer surface of the filters 61 and 62 is removed by the reverse air flow so as to clean the filters 61 and 62. After a predetermined time, the control 207 closes the valve 204 and opens the valve 203 such that air from the tank 201 passes through the pipe 205 into opening 102 to cause reverse flow through the filters 63 and 64 to clean them. Since the valve 204 is closed at this time, air can pass into the filters 61 and 62 and pass out through the exhaust blower 26.

It is seen that this invention provides a novel filter and cleaning arrangement for filters of a fluid bed granulator or dryer. The explosion vents 18 and 21 may be mounted in the top or rear portion of the machine 10 as illustrated in FIG. 1, for example.

FIG. 7 illustrates a modification of the invention wherein the filters are mounted end to end on an axis which extends at a slant angle relative to the horizontal. A pair of transition members 310 and 311 are attached to the outer walls of the machine 10. The transition member 311 is formed with an opening 330 which communicates with the exhaust conduit 23 and has a shoulder 331 through which the opening 330 communicates and a filter support 332 is formed of rods 333, 334 and 336 which are connected as by welding to the shoulder 331. A threaded shaft 337 extends from the end 338 of the filter support and passes through an opening in a cover member 339 and a threaded knob 341 is received on the shaft 337. The cover 339 is formed with a gasket 412 which rests against the wall over opening 442 in the transition member 310 to provide a seal. It is to be realized that a second pair of filters may be mounted between the transition members 310 and 311 parallel but offset from the filters 417 and 418.

It is seen that the present invention provides a new and improved filter system for a fluid bed granulator/dryer and although it has been described with respect to preferred embodiments, it is not to be so limited as changes and modifications may be made therein which are within the full intended scope as defined by the appended claims.

We claim as our invention:

1. A fluid bed dryer machine comprising, a housing, an air inlet attached to a bottom portion of said housing, an exhaust outlet connected to an upper portion of said housing, fan means for moving air from said air inlet through said housing and said air outlet, first support means attached to said housing, a first pair of cylindrically-shaped pleated filters mounted end to end in said upper portion of said housing on said first support means and each formed with an axially extending central opening, one end of said central opening of a first one of said first pair of filters in communication with said air outlet and the other end of said central opening of said first one of said pair of filters in communication with one end of said central opening of a second one of said pair of filters, and sealing means mounted over the other end of said central opening of said second one of said first pair of filters, wherein said support means is formed with a central opening onto which said first pair of end to end cylindrical-shaped pleated filters can be received and said sealing means attached to said support means, including a second support means attached to said housing, a second pair of cylindrically-shaped pleated filters mounted end to end in said upper portion of said housing on said second support means adjacent to said first pair of cylindrically-shaped filters, each of said second pair of filters formed with an axially extending central opening, one end of said central opening of a first one of said second pair of filters in communication with said air outlet and the other end of said central opening of said first one of said second pair of filters in communication with one end of said central opening of a second one of said second pair of filters, and second sealing means mounted over the other end of said central opening of said second one of said second pair of filters, including a source of high pressure air, a first conduit which is attached to said source of high pressure air and extends so as to supply high pressure air into the central openings of said first pair of filters, a second conduit which is attached to said source of high pressure air and extends so as to supply high pressure air into the central opening of said second pair of filters, and first valve means mounted in said first conduit and second valve means mounted in said second conduit, and including control means connected to said first and second valve means and wherein said control means alternately opens and closes said first and second valve means so as to alternately clean said first and second pairs of filters.

2. A fluid bed granulator/dryer according to claim 1 wherein said housing is formed with first and second opening over which said first and second sealing means can be detachably connected.

3. A fluid bed granulator/dryer according to claim 1 wherein said first and second pairs of filters are mounted in said housing so that their axially extending central openings are horizontal.

4. A filter bed granulator/dryer according to claim 1 wherein said first and second pairs of filters are mounted in said housing so that their axially extending central openings are not horizontal.

* * * * *